(12) United States Patent
Hsu

(10) Patent No.: US 11,310,235 B1
(45) Date of Patent: Apr. 19, 2022

(54) INTERNET OF THINGS SYSTEM BASED ON SECURITY ORIENTATION AND GROUP SHARING

(71) Applicant: NETFAY INC., Zhubei (TW)

(72) Inventor: Kuei-Fu Hsu, Taipei (TW)

(73) Assignee: NETFAY INC., Zhubei (TW)

(*) Notice: Subject to any disclaimer, the term of this patent is extended or adjusted under 35 U.S.C. 154(b) by 0 days.

(21) Appl. No.: 17/394,330

(22) Filed: Aug. 4, 2021

(51) Int. Cl.
| | |
|---|---|
| H04L 9/40 | (2022.01) |
| H04L 29/06 | (2006.01) |
| H04L 67/306 | (2022.01) |
| G16Y 30/10 | (2020.01) |
| H04L 65/60 | (2022.01) |
| G16Y 10/75 | (2020.01) |

(52) U.S. Cl.
CPC .......... H04L 63/101 (2013.01); G16Y 10/75 (2020.01); G16Y 30/10 (2020.01); H04L 63/0442 (2013.01); H04L 63/104 (2013.01); H04L 65/60 (2013.01); H04L 67/306 (2013.01); H04L 2463/121 (2013.01)

(58) Field of Classification Search
None
See application file for complete search history.

(56) References Cited

U.S. PATENT DOCUMENTS

| | | | | |
|---|---|---|---|---|
| 8,955,149 B1* | 2/2015 | Baer | ................... | G06F 21/6218 726/28 |
| 10,073,979 B2 | 9/2018 | Von Kaenel et al. | ....................... | G06F 21/604 |
| 10,148,701 B1* | 12/2018 | Hecht | ..................... | G06F 9/455 |
| 10,530,839 B2* | 1/2020 | Kitchen | ................... | H04L 67/10 |
| 10,983,750 B2* | 4/2021 | Bates | ................... | G11B 27/105 |
| 11,108,828 B1* | 8/2021 | Curtis | ................... | H04L 63/104 |
| 11,201,800 B2* | 12/2021 | Natal | ................... | G06F 9/44505 |
| 11,245,728 B1* | 2/2022 | Curtis | ................... | H04L 63/104 |
| 2009/0150972 A1* | 6/2009 | Moon | ................... | H04L 63/102 726/1 |
| 2012/0136936 A1* | 5/2012 | Quintuna | ............ | G06F 21/6245 709/204 |

(Continued)

FOREIGN PATENT DOCUMENTS

| | | | | |
|---|---|---|---|---|
| TW | 202041034 A | 11/2020 | ............. | H04N 19/86 |
| WO | WO2020/149548 A1 | 7/2020 | ............. | H04L 12/28 |
| WO | WO2020/189955 A1 | 9/2020 | ............. | H04L 29/08 |

OTHER PUBLICATIONS

TW109146142, Search Report of Patent App. No. 109146142, Eng. Translation, pp. 1-2, dated Jan. 22, 2021.

*Primary Examiner* — Michael W Chao
(74) *Attorney, Agent, or Firm* — Penilia IP, APC

(57) ABSTRACT

The present application discloses an Internet of Things (IoT) system, comprising a cloud account server, configured to manage user accounts corresponding to the users respectively, wherein the users comprise a first user; a plurality of IoT devices, communicating with the cloud account server respectively, wherein the plurality of IoT devices including a first IoT device corresponding to the first user, and the first IoT device preserves a first authorization list set by the first user; and a plurality of peripheral devices, including a first peripheral device connected to or communicating with the first IoT device. The first IoT device determines whether other users possess a first authority to access the first peripheral device based on the first authorization list.

42 Claims, 1 Drawing Sheet

(56) References Cited

U.S. PATENT DOCUMENTS

| | | | | |
|---|---|---|---|---|
| 2013/0067594 | A1* | 3/2013 | Kantor | G06Q 50/01 |
| | | | | 726/28 |
| 2013/0339441 | A1* | 12/2013 | Vasquez | H04W 4/023 |
| | | | | 709/204 |
| 2014/0081433 | A1* | 3/2014 | Cheong | H04L 12/1895 |
| | | | | 700/90 |
| 2016/0112870 | A1* | 4/2016 | Pathuri | H04W 12/04 |
| | | | | 726/4 |
| 2016/0134932 | A1* | 5/2016 | Karp | H04L 67/22 |
| | | | | 348/155 |
| 2016/0188902 | A1* | 6/2016 | Jin | H04W 4/029 |
| | | | | 726/28 |
| 2016/0212137 | A1* | 7/2016 | Pottier | H04L 63/101 |
| 2016/0345166 | A1* | 11/2016 | Hou | H04W 76/18 |
| 2017/0013016 | A1* | 1/2017 | Wong | H04L 63/20 |
| 2017/0063566 | A1 | 3/2017 | Seminario et al. | H04L 12/28 |
| 2017/0063931 | A1* | 3/2017 | Seed | G06Q 20/40 |
| 2018/0034913 | A1 | 2/2018 | Matthieu et al. | |
| 2018/0115611 | A1* | 4/2018 | Lear | H04L 61/1541 |
| 2019/0268328 | A1* | 8/2019 | Hussein | H04L 63/104 |
| 2020/0137569 | A1* | 4/2020 | Jabara | H04N 21/432 |
| 2020/0389437 | A1* | 12/2020 | Miller | H04L 12/66 |
| 2021/0168132 | A1* | 6/2021 | Smith | H04L 63/104 |
| 2021/0344614 | A1* | 11/2021 | Mehta | H04W 40/24 |
| 2021/0392142 | A1* | 12/2021 | Stephens | H04L 63/105 |

* cited by examiner

INTERNET OF THINGS SYSTEM BASED ON SECURITY ORIENTATION AND GROUP SHARING

CROSS-REFERENCE TO RELATED APPLICATION

This application claims the priority benefit of Taiwan Application Serial No. 109146142, filed on Dec. 25, 2020. All disclosure thereof is incorporated herein by reference.

BACKGROUND OF THE INVENTION

The present invention relates to an Internet of Things (IoT) system. More specifically, the present invention relates to an IoT system based on security orientation and group sharing.

Conventionally, the connection technique of IoT is a peer-to-peer (P2P) network connection mechanism. When an IoT device is connected to another IoT device, the IoT device to be authorized has to establish an authorization account and a corresponding password to verify the identity during connection. Accordingly, each IoT device has to establish exclusive account and password for every network connection requesting to access the resources of the IoT device, and thus the administrator of IoT device must spend much time to establish connection accounts and passwords respectively.

Additionally, the relay server mechanism is utilized to establish a network connection when a P2P network connection cannot be established through the firewall. The relay server may temporarily store the exchange data of connection, which is transmitted to the destination IoT device subsequently. Such mechanism has the following drawbacks: (1) it may involve security concern of information exposure; (2) network delay time is increased because data pass through the relay server; and (3) the use of a relay server may increase the bandwidth used by the cloud server network, and the like.

Furthermore, it is known that the account information for accessing storage, surveillance and display resources of the IoT is individually established and stored in each IoT device, and is not integrated by cloud servers. Moreover, there is no convenient common authorization architecture to authorize and access such resources by use of consistent protocols. Accordingly, each IoT device has to establish exclusive accounts and passwords before the device shares storage, surveillance and display resources, which leads to time-consuming management. Furthermore, it is necessary to integrate different resource authorization protocols, which has the following drawbacks: (1) the efficiency of interface connection between the IoT devices by using different protocols for resource authorization is poorer than that by using consistent protocols for resource authorization; and (2) system development requires to integrate different protocols for resource authorization, which takes a lot of time.

Therefore, it is necessary to seek for an IoT system based on security orientation and group sharing, which can establish a convenient mechanism for authorization distribution and enhance the data security of the IoT system.

SUMMARY OF THE INVENTION

In light of this, the present invention discloses an IoT system which can provide a convenient authorization distribution mechanism and enhance the data security of the IoT system.

In some embodiments, an IoT system comprises: a cloud account server, configured to manage user accounts corresponding to users respectively, wherein the users comprise a first user; a plurality of IoT devices, communicating with the cloud account server respectively, wherein the plurality of IoT devices include a first IoT device corresponding to the first user, and the first IoT device preserves a first authorization list set by the first user; and a plurality of peripheral devices, including a first peripheral device connected to or communicating with the first IoT device. In some embodiments, the first IoT device determines whether other users possess the first authority to access the first peripheral device based on the first authorization list. Each user can apply for a user account with the cloud account server.

In some embodiments, the first peripheral device comprises at least one of a first storage resource device, a first surveillance resource device, and a first displaying resource device.

In another embodiment, the plurality of IoT devices further comprise a second IoT device corresponding to a second user, and the second IoT device preserves a second authorization list set by the second user. The plurality of peripheral devices further comprise a second peripheral device connected to or communicating with the second IoT device, wherein the second IoT device determines whether other users possess the second authority to access the second peripheral device based on the second authorization list. The second peripheral device comprises at least one of a second storage resource device, a second surveillance resource device, and a second displaying resource device. The plurality of IoT devices further comprise a third IoT device corresponding to a third user, and the third IoT device preserves a third authorization list set by the third user. The plurality of peripheral devices further comprise a third peripheral device connected to or communicating with the third IoT device, wherein the third IoT device determines whether other users possess the third authority to access the third peripheral device based on the third authorization list. The third peripheral device comprises at least one of a third storage resource device, a third surveillance resource device, and a third displaying resource device.

In another embodiment, the IoT system further comprises a cloud machine server, a STUN cloud server and a P2P information exchange cloud server, wherein the cloud account server further comprises a private key, and a public key corresponding to the private key; the cloud machine server further comprises a private key, and a public key corresponding to the private key; the STUN cloud server further comprises a private key, and a public key corresponding to the private key; the P2P information exchange cloud server further comprises a private key, and a public key corresponding to the private key. Each of the users further possesses a corresponding output/input device, wherein the first user possesses a first output/input device comprising a private key, and a public key corresponding to the private key. The plurality of IoT devices further comprise a second IoT device corresponding to a second user, wherein the first IoT device comprises a private key, and a public key corresponding to the private key, and the second IoT device comprises a private key, and a public key corresponding to the private key. The first peripheral device further comprises a private key, and a public key corresponding to the private key.

The other embodiments of the present invention and the advantages thereof will be more clearly understood from the following detailed descriptions showing the principle examples of the present invention, in conjunction with the accompanying drawings. Besides, well known components and principles are not described herein in order to not unnecessarily obscure the present invention.

BRIEF DESCRIPTION OF THE DRAWINGS

In the drawings of the present invention, like reference numerals refer to identical or similar elements. Besides, the drawings are only examples, and thus are not necessarily drawn to scale.

DETAILED DESCRIPTION OF THE PREFERRED EMBODIMENTS

Figures 1, 2A, 2B:
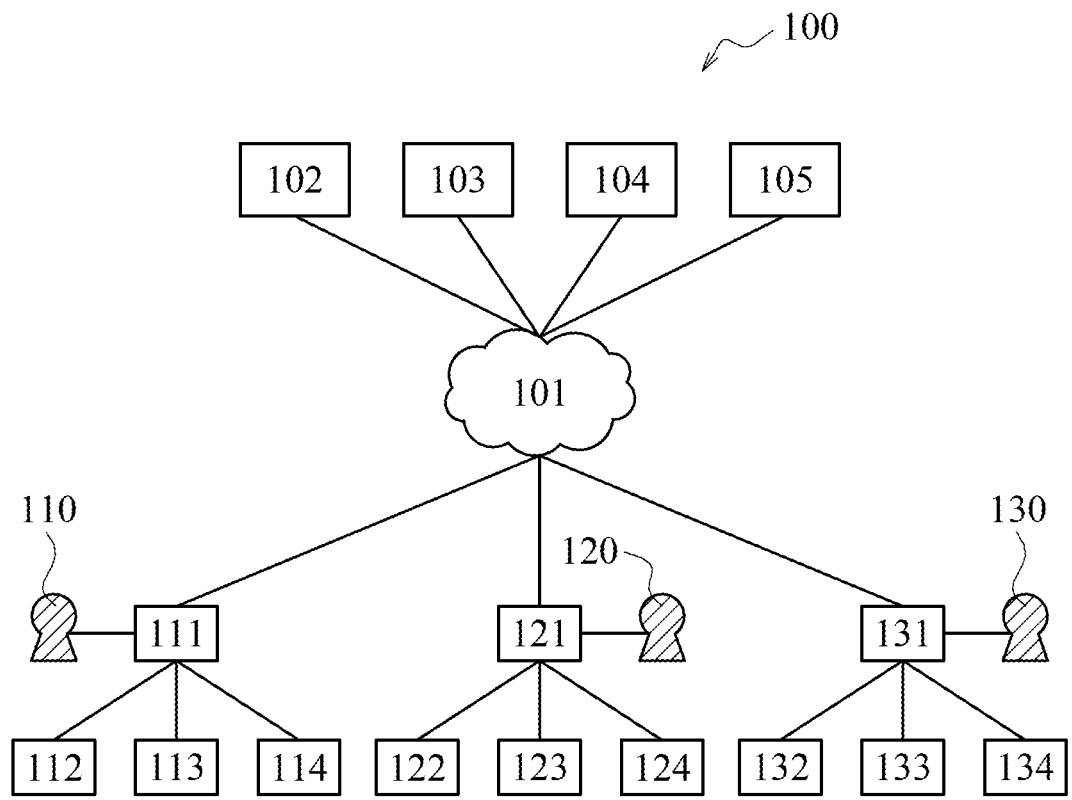
FIG. 1 schematically shows an Internet of Things system in accordance with an embodiment of the present invention.
FIG. 2A schematically shows a table of a first authorization list in accordance with an embodiment of the present invention.
FIG. 2B shows another aspect of the first authorization list in accordance with another embodiment of the present invention.

The present invention is now described in detail with reference to several preferred embodiments as described in the accompanying drawings. In the following description, numerous specific details are set forth in order to provide a thorough understanding of the present invention. However, it will be apparent to one technically skilled that the present invention may be practiced without some or all of these specific details.

FIG. 1 schematically shows an IoT system 100 in accordance with an embodiment of the present invention. As shown in FIG. 1, a cloud 101 comprises a cloud machine server 102 for the management of IoT devices, a cloud account server 103 for the management of user accounts, a STUN cloud server 104 for P2P through-firewall connection, and a P2P information exchange cloud server 105 for P2P through-firewall connection. For example, a first user 110 and a second user 120 may register corresponding first and second user accounts with the cloud account server 103 respectively. The cloud account server 103 may manage the user information of all users (for example, user account, user password, account state representing if the account is publicly searchable, email or phone number). It should be understood that, although two users are described herein, the present invention is not limited to this. The IoT system may comprise of more users or fewer users depending on the actual situation.

As shown in the embodiment of FIG. 1, the first IoT device 111 possessed by the first user 110 may communicate with the cloud 101 (including the cloud machine server 102, the cloud account server 103, the STUN cloud server 104 and the P2P information exchange cloud server 105) through local network, Internet, wired network, wireless network or the other communication methods. Similarly, the second IoT device 121 possessed by the second user 120 may communicate with the cloud 101. It should be understood that, although two IoT devices are described herein, the present invention is not limited to this. The IoT system may comprise of more IoT devices or fewer IoT devices depending on the actual situation. Additionally, a user is not limited to possess only one IoT device, but may possess fewer IoT devices or more IoT devices depending on the actual situation.

The first IoT device 111 may correspond to the first user 110 (for example, being bound to the first user 110), and the second IoT device 121 may correspond to the second user 120 (for example, being bound to the second user 120). More specifically, the first IoT device 111 is bound to the first user 110 by corresponding to the first user account 210, and the second IoT device 121 is bound to the second user 120 by corresponding to the second user account 220. The cloud machine server 102 may manage the binding information (for example, the respective user accounts corresponding to each IoT device), machine device identification code (ID), and the other device information of each IoT device (for example, the first IoT device 111 and the second IoT device 121). The machine device ID and the other device information of each IoT device may be stored as bar code.

In one embodiment, a user may achieve the binding between an IoT device and the user per se by logging in the cloud account server 103 via, for example, a mobile device for identity authentication, and then uploading the corresponding user account and the machine device ID of the IoT device to be bound to the cloud machine server 102. Furthermore, the user may also alter the binding state of the IoT device. For example, a user may communicate with the cloud machine server 102 via, for example, a mobile device, and input the device information of the IoT device to be bound by scanning the bar code, or entering the machine device ID. Thereafter, the cloud machine server 102 determines whether the IoT device has been bound to another user. If the IoT device has been bound to another user, it is necessary to input the user account and password of the original bound user to release the binding state of IoT device before conducting the above binding processes of IoT device. It should be noted that, although the embodiment is described with a mobile device, it is merely used to facilitate understanding the present invention. However, the present invention is not limited to mobile devices, but may be operated by using devices such as personal computers, notebooks, PADs, and the like depending on the actual situation.

In one embodiment, each IoT device may be connected to or communicate with one or more peripheral devices. As shown in FIG. 1, the first IoT device 111 may be connected to or communicate with first peripheral devices. The first peripheral devices include a first storage resource device 112, a first surveillance resource device 113, or a first displaying resource device 114. Each IoT device may preserve an authorization list set by the corresponding user. For example, a first authorization list set by the first user 110 may be stored in the first IoT device 111. The first peripheral device connected to the first IoT device 111 is recorded in the first authorization list, such that whether other users (for example, the second user 120) possess the first authority to access the first peripheral device can be determined. It should be understood that, each user may possess the entire authority for managing the corresponding IoT devices and the peripheral devices connected to the IoT devices.

It should be understood that, although the first user, the first IoT device and the first peripheral device are specifically described in the above descriptions, the present invention is not limited to this. The above contents are also applicable for the other users (for example, the second user 120), the corresponding IoT devices (for example, the second IoT device 121), and the relevant peripheral devices.

In one embodiment, each user may make a selection from all user accounts to create his/her own friend list. For example, the first user may create a first user friend list. The first user friend list may, for example, comprise 0 user account, which means that the first user has not made a friend relationship with any user yet; or may, for example, comprise 10 user accounts, which means that the first user has made friend relationships with the users corresponding to the 10 user accounts respectively.

Furthermore, a user (for example, the first user) may also create a friend authorization list (for example, the first friend authorization list) within the authorization list (for example, the first authorization list) to select the user to be given an authority (for example, the first authority) from the friend list. Illustrate with the above example, the first user may select, for example, 5 user accounts from the 10 user accounts such that the users corresponding to that 5 user accounts possess the first authority to access the first peripheral device.

In one embodiment, each user may also make a selection from all user accounts to create his/her own group list. For example, the first user may create a first user group list comprising one or more groups. Take a single group as an example, the group may, for example, include 0 user account, which means that there are no users in this group; or may, for example, include 10 user accounts, which means that there are 10 users corresponding to the user accounts in this group. It should be understood that, the group list (for example, the first user group list) may not be limited to a single group, but may have unlimited number of groups depending on the actual utilization situation for each user. Additionally, if there are two or more groups, each user may add a user account into the two or more groups. Namely, user accounts may exist in different groups.

Furthermore, a user (for example, the first user) may also create a group authorization list (for example, the first group authorization list) within the authorization list (for example, the first authorization list) to select a user to be authorized from the group list. As illustrated by the above example, the first user may select at least one group from the first user group list, such that the users corresponding to the user accounts within the at least one group possess the first authority to access the first peripheral device.

In one embodiment, a user (for example, the first user) may also create an others authorization list (for example, the first others authorization list) within the authorization list (for example, the first authorization list), so as to preserve all the user accounts managed by the cloud account server and authorize the authority (for example, the first authority) to all the users.

FIG. 2A schematically shows a table of a first authorization list 200 in accordance with an embodiment of the present invention. The first peripheral devices connected to the first IoT device 111 (for example, the first storage resource device 112, the first surveillance resource device 113 and the first displaying resource device 114 in FIG. 2A) and a user authorization list are recorded in the first authorization list 200. The first user may individually set user accounts, by which the first storage resource device 112, the first surveillance resource device 113 or the first displaying resource device 114 can be accessed. In this way, the user (for example, a third user 130) corresponding to the user account (for example, a third user account 230) may access and/or utilize the first storage resource device 112, the first surveillance resource device 113 or the first displaying resource device 114. Furthermore, since the first IoT device 111 is bound to the first user 110, the first user 110 certainly possesses the first authority to access the first peripheral devices. Accordingly, the first user account 210 corresponding to the first user 110 is recorded in the user authorization list, which means the first user 110 possesses the authority to access all peripheral devices (for example, the first storage resource device 112, the first surveillance resource device 113 or the first displaying resource device 114).

As shown in the embodiment in FIG. 2A, since only the first user account 210 and the third user account 230 are recorded in the user authorization list of the first storage resource device 112, only the first user 110 and the third user 130 possess the first authority to access the first storage resource device 112. Since the first user account 210, the second user account 220 and the third user account 230 are recorded in the user authorization list of the first surveillance resource device 113, the first user 110, the second user 120 and the third user 130 all possess the first authority to access the first surveillance resource device 113.

In addition, as shown by the arrow 270 in FIG. 2A, the first user 110 may set the column of the user authorization list as "*", which means the first authority to access the first peripheral device is open to all the user accounts in the cloud account server 103, such that the users corresponding to the user accounts respectively are all able to access the first peripheral device. When a user uses an output/input device (for example, a mobile device, a personal computer, a notebook or a PAD) to communicate with the cloud machine server 102, the cloud machine server 102 may show all the IoT devices set as "*" and their corresponding peripheral devices, so as to notify all users that the peripheral devices are open to use currently. Accordingly, in the embodiment of FIG. 2A, the first user 110 and the third user 130 can access the first storage resource device 112; the first user 110, the second user 120 and the third user 130 can access the first surveillance resource device 113; and all the users, which have registered the respective user accounts with the cloud account server 103, can access the first displaying resource device 114.

FIG. 2B shows another aspect 201 of the first authorization list in accordance with another embodiment of the present invention. The first friend authorization list 211, the first group authorization list 212, the first others authorization list 213 and the respective resource authorization lists are recorded in another aspect 201 of the first authorization list. The first group authorization list 212 comprises a first group list 212a and a second group list 212b. The resource devices authorized by respective lists are recorded in the resource authorization lists.

As shown in the embodiment in FIG. 2B, since the first storage resource device 112 is recorded in the resource authorization list of the first friend authorization list 211, the users corresponding to the user accounts within the first user friend authorization list 211 possess the first authority to access the first storage resource device 112. Similarly, since the first storage resource device 112 is recorded in the resource authorization list of the first group list 212a, the users corresponding to the user accounts within the first group list 212a possess the first authority to access the first storage resource device 112. Since the first storage resource device 112, the first surveillance resource device 113 and the first displaying resource device 114 are recorded in the resource authorization list of the second group list 212b, the users corresponding to the user accounts within the second group list 212b possess the first authority to access the first storage resource device 112, the first surveillance resource device 113 and the first displaying resource device 114. Since the first displaying resource device 114 is recorded in the resource authorization list of the first others authorization list 213, all the users, who have registered their user accounts with the cloud account server 103, can access the first displaying resource device 114.

The first authority opened by the first user 110 for the first storage resource device 112 (for example, hard disk drive or solid state disk) may include but not be limited to a folder-setting authority, a file-reading authority, a file-writing authority, or combinations thereof. In some embodiments, the folder-setting authority may further comprise a read-only setting authority, a read/write setting authority, or the combination thereof.

The first authority opened by the first user 110 for the first surveillance resource device 113 (for example, a web camera or a surveillance camera) may include but not be limited to a live-view authority, a recording authority, a replaying authority, a system parameter setting authority, or combinations thereof.

The first authority opened by the first user 110 for the first displaying resource device 114 (for example, a screen display device) may include but not be limited to a receiving pushed multimedia authority, an authority for synchronously playing the content played by a remote IoT device, or combinations thereof.

It should be understood that, although the first user, first IoT device and the first peripheral devices are specifically indicated in the above descriptions, the present invention is not limited to this. The above contents are also applicable for other users (for example, the second user 120), the corresponding IoT devices (for example, the second IoT device 121) and the relevant peripheral devices.

In addition, when an IoT device communicates with the cloud 101, the IoT device may download from the cloud 101 and store the user's account information of the authorized user listed in each authorization list (for example, a friend authorization list, a group authorization list or an others authorization list). When an IoT device does not communicate with the cloud 101, the IoT device may enable the current authorized users (i.e. the authorized users corresponding to the user accounts currently listed in each authorization list) to obtain the peripheral devices accessing authority based on the authorized user's account information downloaded and stored previously.

Moreover, during the period that an IoT device does not communicate with the cloud 101, if the user's account information of any authorization list has been altered, then the IoT device may update the user's account information by downloading the same from the cloud 101 when the IoT device communicates with the cloud 101 again. In this way, the updated authorized users (i.e. the authorized users corresponding to the user accounts listed in each updated authorization list) can obtain the access authority of peripheral devices.

As shown in FIG. 1, since the first user 110 possesses all operation authorities (i.e. the first authority) for the first IoT device and the connected resource devices thereof, the first user may perform at least one of the following operations:
(1) accessing a content stored in the first storage resource device 112 or playing a content stored in the first storage resource device 112 by use of the first displaying resource device 114;
(2) playing a real-time video content of the first surveillance resource device 113 in real time by use of an output/input device (for example, a mobile device, a personal computer, a notebook, or a PAD) or the first displaying resource device 114;
(3) storing a content recorded from the first surveillance resource device 113 in the first storage resource device 112;
(4) replaying a content recorded from the first surveillance resource device 113 and stored in the first storage resource device 112.

In one embodiment, the first user 110 may authorize the first authority to the second user 120 by use of, for example, the aforementioned first authorization list, friend authorization list, group authorization list or others authorization list. In this embodiment, since the second user 120 possesses the first authority, the second user may perform at least one of the following operations:
(1) playing a real-time video content of the first surveillance resource device 113 in real time by use of an output/input device or the first displaying resource device 114;
(2) replaying a content recorded from the first surveillance resource device 113 and stored in the first storage resource device 112 by use of the output/input device or the first displaying resource device 114;
(3) accessing a content stored in the first storage resource device 112.

In another embodiment, as shown by FIG. 1, the IoT system may further comprise the third user 130, the third IoT device 131, the third storage resource device 132, the third surveillance resource device 133 and the third displaying resource device 134, the relative relationship of each is as descripted above, so it will not be repeated here. In this embodiment, when the second user 120 possesses the first authority, the second user 120 may perform at least one of the following operations:
(1) playing a content stored in the first storage resource device 112 by use of the first displaying resource device 114;
(2) playing a content stored in the first storage resource device 112 by use of the second displaying resource device 124;
(3) playing a real-time video content of the first surveillance resource device 113 by use of the second displaying resource device 124.

In a further embodiment, the second user 120 is authorized the authority for peripheral devices by the first user 110 and the third user 130, respectively. In other words, the second user 120 possesses the first authority and the third authority, and thus the second user 120 may perform at least one of the following operations:
(1) synchronously playing the same content of the first displaying resource device 114 and/or the third displaying resource device 134 by use of the first displaying resource device 114, the second displaying resource device 124 and/or the third displaying resource device 134;
(2) playing a content stored in the first storage resource device 112, the second storage resource device 122 and/or the third storage resource device 132 by use of the first displaying resource device 114 and/or the third displaying resource device 134.

In other further embodiment, when the second user 120 possesses the first authority and the third authority, the second user 120 may perform at least one of the following operations:
(1) accessing a content stored in the first storage resource device 112 and/or the third storage resource device 132;
(2) storing a video content recorded from the first surveillance resource device 113, the second surveillance resource device 123 and/or the third surveillance resource device 133 in the first storage resource device 112 and/or the third storage resource device 132.

Through this embodiment, a video content recorded from each surveillance resource device may be stored in the storage resource devices of the other users. Therefore, for example, when the second surveillance resource device 123 of the second user 120 is damaged, since a content recorded from the second surveillance resource device 123 is stored in the first storage resource device 112 and/or the third storage resource device 132, the criminal evidence can still be found.

The term "communicate" referred herein includes using encryption technology to improve the data security, so as to ensure that the message to be transmitted not be cracked by hackers. The encryption method used in the IoT architecture herein will be further described as follow.

In one embodiment, the cloud 101's cloud account server 103 or the cloud 101's other servers (for example, the cloud machine server 102, the STUN cloud server 104 or the P2P information exchange cloud server 105) may possess a private key and a public key corresponding to the private key, respectively. For example, the cloud account server 103 may possess a private key, and a public key corresponding to the private key.

The users may possess respective output/input devices (for example, cell phones, personal computers, notebooks or PADs) wherein each output/input device possesses its own private key and a public key corresponding to the private key. For example, the first user 110 may possess a first output/input device (for example, a cell phone) having its own private key and a public key corresponding to the private key. In addition, each user may possess more than one output/input device, wherein each output/input device possess its own private key and a public key corresponding to the private key.

Similarly, the IoT device corresponding to each user may also possess its own private key and a public key corresponding to the private key. For example, the first IoT device 111 may possess a private key, and a public key corresponding to the private key.

Similarly, for each IoT device, each of the peripheral devices communicating therewith may also possess its own private key and a public key corresponding to the private key. For example, the first surveillance resource device 113 may possess a private key, and a public key corresponding to the private key.

In this embodiment, when the first user 110 communicates with the first IoT device 111 via a first output/input device, the first output/input device and the first IoT device 111 will establish an encrypted communication channel between the two parties by using the private keys and the public keys owned respectively, and cryptographic algorithms known in the field of information security to transmit data. In this way, all plaintext data will be encrypted before transmission to ensure that the intermediate servers used for transmitting data cannot obtain the content of the transmitted data, and only the two parties can obtain the plaintext data by means of decryption. It should be understood that, although the invention is described by using the first output/input device and the first IoT device 111 as examples, the invention is not limited to this. The first output/input device may also communicate with the second IoT device 121 or the other IoT devices, and the aforementioned encryption processes are still applicable.

In this embodiment, the aforementioned encryption processes may also be utilized in the communication between two IoT devices, between the cloud 101 (including each cloud server) and each IoT device, between two servers of the cloud 101, between each IoT device and each of its connected peripheral devices, and between the first output/input device and each cloud server. In addition, a timestamp or a nonce may be added in the cryptographic algorithm of the aforementioned encryption processes to prevent replay attacks when transmitting data between two parties.

Furthermore, when an error occurs on a peripheral device connected to an IoT device, the IoT device may automatically push the error information of the peripheral device to some receivers based on a receiver list preset by the system, such that the receivers may deal with the error or replace the abnormal device.

The IoT system disclosed in the present invention uses the user accounts within the cloud account server as the basis of authorization. Accordingly, the owner of IoT device does not need to create the authorized account during authorization, and thus saving plenty of time. In addition, a user can manage or access each authorized IoT device and its connected peripheral devices by use of a single user account corresponding to the user, which has the advantages of saving the process steps and account management. The invention also provides a group authorization architecture, which is convenient for the IoT device manager to create different groups depending on respective authorities. Specifically, the manager may give different authorities to access peripheral devices for different groups, it saves on the need to set each user with the same authorization individually, therefore saving management time. In addition, in the IoT system disclosed in the present invention, the cloud account server is merely used to manage the user accounts for authorization verification, and the data in the peripheral devices connected to each IoT device do not pass through the cloud, but are transmitted between the authorized IoT devices. Moreover, the security of communication is enhanced by the aforementioned encryption processes, so as to establish an IoT system based on security orientation and group sharing.

Although the present invention has been described with reference to several preferred embodiments and the drawings, the embodiments and drawings are merely illustrative and not restrictive for the present invention. Various modifications, alterations, and equivalent substitutions may be made by the technically skilled person without departing from the spirit or scope of the invention. Accordingly, the claimed scope of the invention shall be defined by the accompanying claims.

What is claimed is:

1. An Internet of Things (IoT) system, comprising:
 a cloud account server, configured to manage user accounts corresponding to users respectively, wherein each of the users can apply for a user account with the cloud account server, and the users comprise a first user;
 a plurality of IoT devices, communicating with the cloud account server respectively, wherein the plurality of IoT devices include a first IoT device corresponding to the first user, and the first IoT device preserves a first authorization list set by the first user;
 a plurality of peripheral devices, including a first peripheral device connected to or communicating with the first IoT device;
 a cloud machine server;
 a STUN cloud server; and
 a P2P information exchange cloud server,
 wherein,
 the first IoT device determines whether other users possess a first authority to access the first peripheral device based on the first authorization list, and
 the cloud account server further comprises a private key, and a public key corresponding to the private key; the cloud machine server further comprises a private key, and a public key corresponding to the private key; the STUN cloud server further comprises a private key, and a public key corresponding to the private key; the P2P information exchange cloud server further comprises a private key, and a public key corresponding to the private key;

each of the users further possesses a corresponding output/input device, wherein the first user possesses a first output/input device, the first output/input device comprises a private key, and a public key corresponding to the private key;

the plurality of IoT devices further comprise a second IoT device corresponding to a second user, wherein the first IoT device comprises a private key, and a public key corresponding to the private key, and the second IoT device comprises a private key, and a public key corresponding to the private key; and the first peripheral device further comprises a private key, and a public key corresponding to the private key.

2. The IoT system of claim 1, wherein the first peripheral device comprises at least one of a first storage resource device, a first surveillance resource device, and a first displaying resource device.

3. The IoT system of claim 2, wherein when the first peripheral device comprises the first storage resource device, the first authority includes at least one of a folder-setting authority, a file-reading authority, and a file-writing authority for the first storage resource device.

4. The IoT system of claim 3, wherein the folder-setting authority includes at least one of a read-only setting authority, and a read/write setting authority.

5. The IoT system of claim 2, wherein when the first peripheral device comprises the first surveillance resource device, the first authority includes at least one of a live-view authority, a recording authority, a replaying authority, and a system parameter setting authority.

6. The IoT system of claim 2, wherein when the first peripheral device comprises the first displaying resource device, the first authority includes at least one of a receiving pushed multimedia authority, and an authority for synchronously playing a content of remote IoT devices.

7. The IoT system of claim 2, wherein when the first peripheral device comprises the first storage resource device, the first user accessing a content stored in the first storage resource device.

8. The IoT system of claim 2, wherein when the first peripheral device comprises the first storage resource device and the first displaying resource device, the first user playing a content stored in the first storage resource device by use of the first displaying resource device.

9. The IoT system of claim 2, wherein when the first peripheral device comprises the first storage resource device and the first surveillance resource device, at least one of the following operations being performed:

the first user playing a real-time video content of the first surveillance resource device in real time;

the first user storing a content recorded from the first surveillance resource device in the first storage resource device;

the first user replaying a content recorded from the first surveillance resource device and stored in the first storage resource device;

the second user playing a real-time video content of the first surveillance resource device in real time when a second user possesses the first authority; and the second user replaying a content recorded from the first surveillance resource device and stored in the first storage resource device when the second user possesses the first authority.

10. The IoT system of claim 2, wherein when the first peripheral device comprises the first storage resource device and a second user possesses the first authority, the second user accessing a content stored in the first storage resource device.

11. The IoT system of claim 2, wherein:

the plurality of IoT devices further comprise a second IoT device corresponding to a second user, and the second IoT device preserves a second authorization list set by the second user;

the plurality of peripheral devices further comprise a second peripheral device connected to or communicating with the second IoT device, wherein the second IoT device determines whether other users possess a second authority to access the second peripheral device based on the second authorization list, and the second peripheral device comprises at least one of a second storage resource device, a second surveillance resource device, and a second displaying resource device;

the plurality of IoT devices further comprise a third IoT device corresponding to a third user, and the third IoT device preserves a third authorization list set by the third user;

the plurality of peripheral devices further comprise a third peripheral device connected to or communicating with the third IoT device, wherein the third IoT device determines whether other users possess a third authority to access the third peripheral device based on the third authorization list, and the third peripheral device comprises at least one of a third storage resource device, a third surveillance resource device, and a third displaying resource device.

12. The IoT system of claim 11, wherein when the first peripheral devices comprise the first storage resource device, the first displaying resource device and the first surveillance resource device, the second peripheral devices comprise the second displaying resource device, and the second user possesses the first authority, at least one of the following operations being performed:

the second user playing a content stored in the first storage resource device by use of the first displaying resource device;

the second user playing a content stored in the first storage resource device by use of the second displaying resource device;

the second user playing a real-time video content of the first surveillance resource device by use of the second displaying resource device; and the second user replaying a content recorded from the first surveillance resource device and stored in the first storage resource device by use of the second displaying resource device.

13. The IoT system of claim 11, wherein when the first peripheral device comprises the first displaying resource device, the second peripheral device comprises the second displaying resource device, the third peripheral device comprises the third displaying resource device, and the second user possesses the first authority and the third authority, at least one of the following operations being performed:

the second user synchronously playing the same content of the first displaying resource device by use of the second displaying resource device;

the second user synchronously playing the same content of the third displaying resource device by use of the second displaying resource device;

the second user synchronously playing the same content of the first displaying resource device by use of the third displaying resource device; and the second user synchronously playing the same content of the third displaying resource device by use of the first displaying resource device.

14. The IoT system of claim 11, wherein when the first peripheral devices comprise the first displaying resource device and the first storage resource device, the second peripheral devices comprise the second displaying resource device and the second storage resource device, the third peripheral devices comprise the third displaying resource device and the third storage resource device, and the second user possesses the first authority and the third authority, at least one of the following operations being performed:

the second user playing a content stored in the second storage resource device by use of the first displaying resource device;

the second user playing a content stored in the second storage resource device by use of the third displaying resource device;

the second user playing a content stored in the first storage resource device by use of the third displaying resource device; and the second user playing a content stored in the third storage resource device by use of the first displaying resource device.

15. The IoT system of claim 11, wherein when the first peripheral devices comprise the first surveillance resource device and the first storage resource device, the second peripheral devices comprise the second surveillance resource device and the second storage resource device, the third peripheral devices comprise the third surveillance resource device and the third storage resource device, and the second user possesses the first authority and the third authority, at least one of the following operations being performed:

the second user accessing a content stored in the first storage resource device;

the second user accessing a content stored in the third storage resource device;

the second user storing a video content recorded from the first surveillance resource device in the first storage resource device;

the second user storing a video content recorded from the second surveillance resource device in the first storage resource device;

the second user storing a video content recorded from the third surveillance resource device in the first storage resource device;

the second user storing a video content recorded from the first surveillance resource device in the third storage resource device;

the second user storing a video content recorded from the second surveillance resource device in the third storage resource device; and the second user storing a video content recorded from the third surveillance resource device in the third storage resource device.

16. The IoT system of claim 1, wherein the first user makes selections from the user accounts to create a first user friend list.

17. The IoT system of claim 16, wherein the first authorization list further comprises:

a first friend authorization list, configured to preserve at least one user account selected from the first user friend list by the first user, so as to authorize the first authority to the user corresponding to the at least one user account.

18. The IoT system of claim 17, wherein the first IoT device downloads and stores the information of the at least one user account preserved in the first friend authorization list from the cloud account server.

19. The IoT system of claim 18, wherein when the first IoT device does not communicate with, and then communicates again with the cloud account server, the first IoT device downloads and stores the updated information of user's account.

20. The IoT system of claim 1, wherein the first user makes selections from the user accounts to create a first user group list.

21. The IoT system of claim 20, wherein the first authorization list further comprises:

a first group authorization list, configured to preserve at least one group selected from the first user group list by the first user, so as to authorize the first authority to the users corresponding to the user accounts within the at least one group.

22. The IoT system of claim 21, wherein the first IoT device downloads and stores the information of the at least one user account in the at least one group of the first group authorization list from the cloud account server.

23. The IoT system of claim 22, wherein when the first IoT device does not communicate with, and then communicates again with the cloud account server, the first IoT device downloads and stores the updated information of user's account.

24. The IoT system of claim 1, wherein the first authorization list further comprises:

a first others authorization list, configured to preserve the user accounts managed by the cloud account server, so as to authorize the first authority to all the users.

25. The IoT system of claim 1, further comprising:

a cloud machine server, configured to register a plurality of identification (ID) respectively corresponding to the plurality of IoT devices, and information of the user accounts respectively corresponding to the plurality of ID.

26. The IoT system of claim 1, wherein when the first output/input device communicates with the first IoT device, an encrypted communication channel being established by use of the private key for first output/input device, the public key for first output/input device, the private key for first IoT device and the public key for first IoT device through cryptographic algorithms; and the first output/input device or the first IoT device being able to decrypt an encrypted message.

27. The IoT system of claim 26, wherein a timestamp or a nonce is further added in the encrypted communication channel.

28. The IoT system of claim 1, wherein when the first output/input device communicates with the second IoT device, an encrypted communication channel being established by use of the private key for first output/input device, the public key for first output/input device, the private key for second IoT device and the public key for second IoT device through cryptographic algorithms; and the first output/input device or the second IoT device being able to decrypt an encrypted message.

29. The IoT system of claim 28, wherein a timestamp or a nonce is further added in the encrypted communication channel.

30. The IoT system of claim 1, wherein when the first IoT device communicates with the second IoT device,
- an encrypted communication channel being established by use of the private key for first IoT device, the public key for first IoT device, the private key for second IoT device and the public key for second IoT device through cryptographic algorithms; and
- the first IoT device or the second IoT device being able to decrypt an encrypted message.

31. The IoT system of claim 30, wherein a timestamp or a nonce is further added in the encrypted communication channel.

32. The IoT system of claim 1, wherein when the cloud account server communicates with the first IoT device,
- an encrypted communication channel being established by use of the private key for cloud account server, the public key for cloud account server, the private key for first IoT device and the public key for first IoT device through cryptographic algorithms; and
- the cloud account server or the first IoT device being able to decrypt an encrypted message.

33. The IoT system of claim 32, wherein when the cloud account server is replaced by one of the cloud machine server, the STUN cloud server or the P2P information exchange cloud server, and communicates with the first IoT device by means of the same logic,
- an encrypted communication channel being established by use of the respective private keys and public keys through cryptographic algorithms; and
- two parties of the encrypted communication channel being able to decrypt an encrypted message respectively.

34. The IoT system of claim 33, wherein a timestamp or a nonce is further added in the encrypted communication channel.

35. The IoT system of claim 32, wherein a timestamp or a nonce is further added in the encrypted communication channel.

36. The IoT system of claim 1, wherein when the first output/input device communicates with the cloud account server,
- an encrypted communication channel being established by use of the private key for first output/input device, the public key for first output/input device, the private key for cloud account server and the public key for cloud account server through cryptographic algorithms; and
- the first output/input device or the cloud account server being able to decrypt an encrypted message.

37. The IoT system of claim 36, wherein when the cloud account server is replaced by one of the cloud machine server, the STUN cloud server or the P2P information exchange cloud server, and communicates with the first output/input device by means of the same logic:
- an encrypted communication channel being established by use of the respective private keys and public keys through cryptographic algorithms; and
- two parties of the encrypted communication channel being able to decrypt an encrypted message respectively.

38. The IoT system of claim 37, wherein a timestamp or a nonce is further added in the encrypted communication channel.

39. The IoT system of claim 36, wherein a timestamp or a nonce is further added in the encrypted communication channel.

40. The IoT system of claim 1, wherein when the first IoT device communicates with the first peripheral device,
- an encrypted communication channel being established by use of the private key for first IoT device, the public key for first IoT device, the private key for first peripheral device and the public key for first peripheral device through cryptographic algorithms; and
- the first IoT device or the first peripheral device being able to decrypt an encrypted message.

41. The IoT system of claim 40, wherein a timestamp or a nonce is further added in the encrypted communication channel.

42. The IoT system of claim 1, wherein when an error occurs on the first peripheral device, the error information of the first peripheral device being pushed automatically to some receivers based on a receiver list preset by the IoT system.

* * * * *